No. 638,315. Patented Dec. 5, 1899.
O. BOLTE.
MACHINE FOR MANUFACTURING RAILWAY SPIKES.
(Application filed Oct. 31, 1898.)
(No Model.)
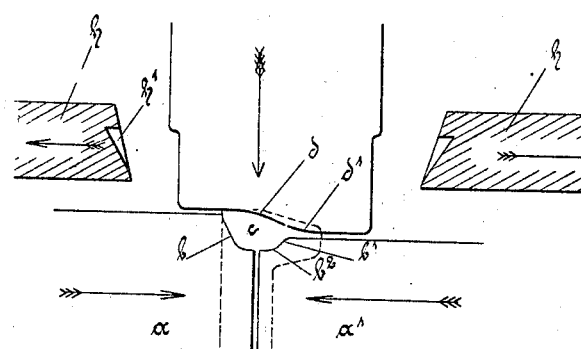
Fig. 1.
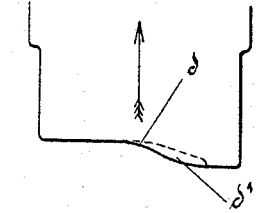
Fig. 2.
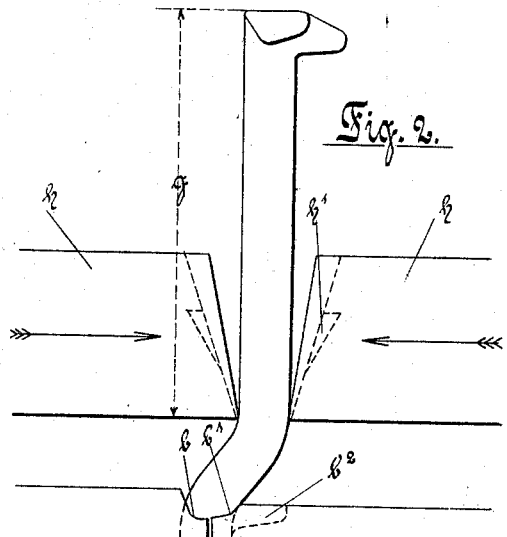
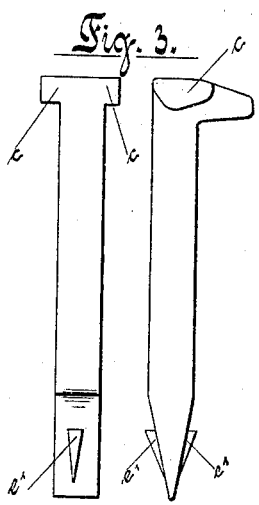
Fig. 3. Fig. 4.
Fig. 5.
Witnesses:
William Miller.
John Becker.
Inventor:
Otto Bolte,
by his attorneys
Roeder & Briesen

United States Patent Office.

OTTO BOLTE, OF DORTMUND, GERMANY.

MACHINE FOR MANUFACTURING RAILWAY-SPIKES.

SPECIFICATION forming part of Letters Patent No. 638,315, dated December 5, 1899.

Application filed October 31, 1898. Serial No. 694,987. (No model.)

*To all whom it may concern:*

Be it known that I, OTTO BOLTE, a subject of the King of Prussia, Emperor of Germany, residing at 40 Schwanenwall, Dortmund, in the Kingdom of Prussia, Germany, have invented certain new and useful Improvements in Machines for the Manufacture of Rail-Spikes from the Cold Metal; and I do hereby declare that the following is a full, clear, and exact description of the same.

My invention relates to a machine for the manufacture of rail-spikes provided with so-called "dog ears"—that is to say, with projections on each side of the head for the purpose of facilitating the withdrawal of the spike by means of a suitable instrument, (a so-called "crowbar.") The lower ends of these spikes are wedge-shaped, each one of the converging faces being provided with one or several projections, which act as barbs, opposing the removal of the spikes. It is already possible to manufacture these spikes in one heat; but it has not so far been possible to produce them complete from the cold metal in one set of operations. According to the present invention these spikes can now be produced cold in an uninterrupted series of successive operations and afterward annealed.

The wire or bar from which the spikes are to be manufactured is gripped at one of its ends between side jaws, whereupon a top die presses the material of the projecting end of the bar in suitable cavities provided in the said jaws and top die. Both jaws are then separated and the top die moved back. The wire or bar provided with the head so formed is then moved sufficiently outward of the aforesaid jaws to permit of two cutters moving toward each other to cut off the projecting parts and, if desired, to form, by means of suitable depressions provided on them, the aforesaid barbs or jaggings on the inclined faces of the point. The cutters are so arranged and the movement of the same is such that thereby the projecting end of the wire or bar is bent by cutting off the spike, as shown in Fig. 2. The spikes manufactured in this manner are then annealed in a suitable furnace.

The means employed in carrying out my invention are shown in the accompanying drawings, in which—

Figure 1 shows the device partly in elevation and partly in section. Fig. 2 shows the position of same in another stage of the manufacture. Figs. 3, 4, and 5 represent the completed rail-spike with pointed end provided with serrations or prominences.

Jaw $a$ is provided with a hollow $b$, and jaw $a'$ with a smaller one $b'$, both these hollows corresponding together to the shape of the dog-ears or projections $c$ to be formed in the spike-head. Jaw $a'$ is besides provided with another depression $b^2$, corresponding to the lower part of the spike-head. The lower face of the top die $d$ is formed into steps and provided with the cavity $d'$, corresponding to the upper part of the head of the rail-spike. To form the head, bar $e$ is raised above the jaws $a\ a'$, so that the latter grip it firmly, grooves $f\ f'$ being provided therein for this purpose. As soon as jaws $a\ a'$ grip the end of the bar the top die $d$ comes down and presses the material of the projecting end partly sidewise into hollows $b\ b'$ and partly forward into cavities $d'\ b^2$. The head of the spike is shaped in the manner shown in Fig. 3. The cavities in the jaws $a\ a'$ are open laterally, and can thus receive any suitable quantity of metal without bursting. Bar $e$ is now moved forward until the distance $g$ between the head and the lower edge of the cutters $h$ is about equal to the required length of the spike. Jaws $a\ a'$ move horizontally toward each other at the same time as top die $d$ is moved back to its original position. As soon as the proper distance $g$ is reached, Fig. 2, the cutters $h$ move toward each other and sever the upper part from the remainder of the bar, thereby bending forward the projecting part of the remainder—*i. e.*, bending the same so that there will be the most material on that side where the head of the spike is to be formed. The faces of the cutters which advance toward the spike have the same inclination as the oblique faces forming the point. As shown in Figs. 1 and 2, cutters $h$ are provided with depressions $h'$ above their cutting edges, which on the severance of the spike form projections $e'$, as shown in Fig. 3. These projections are simply produced by the metal of the bar being squeezed into the aforesaid depressions $h'$ while the spike is being severed. Instead of projections $e'$ the metal at the point of the spike may be formed in a larger or lesser number of sharp-pointed prominences or of serrated indentations. These projecting serrations may, as shown in Fig. 4, be V-shaped. A point having pointed prominences is represented in Fig. 5. When several such prominences or indentations are provided, as shown in Figs. 4 and 5, they need only have a proportionately-reduced height.

The projections or prominences provided on the point of the spike fulfil a double purpose. First, they keep the metal together, so as to prevent its being squeezed out in any direction when the point of the spike is formed and the same severed from the bar, as would otherwise be the case, and prevent the formation of a serviceable point when the cold process of manufacture is carried out, and, secondly, they act as barbs, imparting a firmer hold to the driven spike without rendering the driving in thereof perceptibly more difficult. If no importance is attached to these advantages, these projections may be omitted.

When a spike has been obtained in this manner, the fresh upper end of the bar is in the proper position relatively to the jaws, and while cutters $h$ recede from each other it is seized by jaws $a\ a'$, whereupon the above-described operations are repeated, and so on. The spike thus obtained is annealed in a suitable furnace.

Having described my invention, what I claim is—

A machine for forming rail-spikes, composed of a pair of laterally-movable dies $a$, $a'$, having open cavities $b$, $b'$, $b^2$, adapted to form the dog-ears, and the bottom of the spike-head, a vertically-movable coacting die $d$, having a cavity $d'$, and a pair of laterally-movable cutting-dies $h$, $h$, arranged in proximity to the dies $a$, $a'$, and having cavities $h'$, above their cutting edges, substantially as specified.

In witness whereof I have hereunto signed my name in the presence of two subscribing witnesses.

OTTO BOLTE.

Witnesses:
R. E. JAHN,
OTTO KÖNIG.